(12) United States Patent
Ponnuswamy (10) Patent No.: US 9,843,941 B2
(45) Date of Patent: Dec. 12, 2017

(54) DELAYING EXECUTION OF A CORRECTIVE ACTION IN A WIRELESS ENVIRONMENT

(71) Applicant: KodaCloud Inc., Campbell, CA (US)

(72) Inventor: Subbu Ponnuswamy, Saratoga, CA (US)

(73) Assignee: KodaCloud Inc., Campbell, CA (US)

( * ) Notice: Subject to any disclaimer, the term of this patent is extended or adjusted under 35 U.S.C. 154(b) by 167 days.

(21) Appl. No.: 14/985,888

(22) Filed: Dec. 31, 2015

(65) Prior Publication Data
US 2017/0195895 A1   Jul. 6, 2017

(51) Int. Cl.
*H04W 24/02* (2009.01)
*H04W 24/08* (2009.01)

(52) U.S. Cl.
CPC ............ *H04W 24/02* (2013.01); *H04W 24/08* (2013.01)

(58) Field of Classification Search
CPC .............................. H04W 24/02; H04W 24/08
See application file for complete search history.

(56) References Cited

U.S. PATENT DOCUMENTS

| | | | | |
|---|---|---|---|---|
| 6,321,263 B1 * | 11/2001 | Luzzi | ................. | G06F 11/3495 702/186 |
| 8,824,261 B1 * | 9/2014 | Miller | ................... | G11B 33/08 360/97.19 |
| 2007/0032345 A1 * | 2/2007 | Padmanabhan | ........ | A63B 24/00 482/8 |
| 2007/0198223 A1 * | 8/2007 | Ella | ........................ | G06Q 50/06 702/188 |
| 2008/0052628 A1 * | 2/2008 | Bugenhagen | ....... | H04L 41/0896 715/736 |
| 2008/0301499 A1 * | 12/2008 | Grichnik | ............ | G05B 23/0232 714/25 |
| 2009/0281891 A1 * | 11/2009 | Walker | ............... | G06Q 30/0238 705/14.38 |
| 2009/0300430 A1 * | 12/2009 | Nissan-Messing | . | G06F 11/0739 714/48 |
| 2010/0274637 A1 * | 10/2010 | Li | .......................... | G06Q 10/06 379/265.06 |
| 2011/0216692 A1 * | 9/2011 | Lundsgaard | .......... | H04W 48/20 370/328 |
| 2013/0079972 A1 * | 3/2013 | Lake | .................... | G07C 5/0808 701/31.6 |
| 2013/0103990 A1 * | 4/2013 | Hopper | ............... | G06F 11/0793 714/49 |
| 2014/0282586 A1 * | 9/2014 | Shear | .................... | G06F 9/5072 718/104 |

(Continued)

*Primary Examiner* — Khaled Kassim
(74) *Attorney, Agent, or Firm* — Invoke (57) ABSTRACT

Techniques are disclosed for delaying execution of a corrective action in a wireless environment. During a first time period, a performance level is detected. The performance level is determined to not match a performance criterion. However, a corrective action that improves the performance level is not immediately executed. During a second time period, a set of network activities is detected. If the set of network activities does not match a modification criterion, then execution of the corrective action is delayed. The set of network activities is detected periodically until the set of network activities matches the modification criterion. If the set of network activities matches the modification criterion, then the corrective action is executed.

17 Claims, 4 Drawing Sheets

(56) References Cited

U.S. PATENT DOCUMENTS

| | | | | |
|---|---|---|---|---|
| 2014/0324372 | A1* | 10/2014 | Suuronen | G01R 31/1227 |
| | | | | 702/66 |
| 2015/0319768 | A1* | 11/2015 | Abdelmonem | H04L 5/006 |
| | | | | 455/452.1 |
| 2016/0127277 | A1* | 5/2016 | Faulkner | H04L 51/30 |
| | | | | 709/206 |
| 2016/0360412 | A1* | 12/2016 | Wilson | H04W 12/08 |
| 2016/0371507 | A1* | 12/2016 | Jakobsson | H04L 63/04 |
| 2017/0126477 | A1* | 5/2017 | Ponnuswamy | H04L 41/0654 |
| 2017/0126483 | A1* | 5/2017 | Ponnuswamy | H04L 41/0681 |
| 2017/0230128 | A1* | 8/2017 | Abdelmonem | H04J 11/005 |

* cited by examiner

DELAYING EXECUTION OF A CORRECTIVE ACTION IN A WIRELESS ENVIRONMENT

TECHNICAL FIELD

The present disclosure relates to corrective actions in a wireless environment. In particular, the present disclosure relates to delaying execution of a corrective action in a wireless environment.

BACKGROUND

In recent years, Wireless Local Area Network (WLAN) technologies have emerged as a fast-growing market. Among the various WLAN technologies, the Institute of Electrical and Electronics Engineers (IEEE) 802.11 standard is the dominating technology and is frequently used for WLANs. The IEEE 802.11 standard includes operations in one or more bands (such as the 2.400-2.500 GHz band and/or the 4.915-5.825 GHz band), and multiple channels within each band.

Client devices within WLANs wirelessly communicate with network devices. A client device may communicate with a network device to obtain access to a network resource. Alternatively, a client device may receive broadcast data from a network device, even if the client device had not requested access to a network resource. The client device may connect to the network resource only in response to a request or trigger. Network devices, such as access points, are digital devices that may be communicatively coupled to one or more networks (e.g., Internet, an intranet, etc.). Network devices may be directly connected to the one or more networks or connected via a controller. A network device, as referred to herein, may include a wireless Access Point (AP) that communicates wirelessly with devices using Wi-Fi, Bluetooth or related standards and that communicates with a wired network. A network device may provide a wireless coverage area, within which devices may wirelessly connect to a network through the network device.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. General Overview

One or more embodiments include delaying execution of a corrective action in a wireless environment. During a first time period, a performance level is detected. The performance level is determined to not match a performance criterion. However, a corrective action that improves the performance level is not immediately executed. During a second time period, a set of network activities is detected. If the set of network activities does not match a modification criterion, then execution of the corrective action is delayed. The set of network activities is detected periodically until the set of network activities matches the modification criterion. If the set of network activities matches the modification criterion, then the corrective action is executed.

A corrective action improves long-term performance by modifying one or more wireless configurations of the wireless environment. However, executing the corrective action may cause a short-term drop in performance. As an example, a change in a radio frequency (RF) channel of an AP disrupts the existing wireless connections between the AP and client devices. As another example, forcing a client device to switch from associating with a first AP to associating with a second AP disrupts the existing wireless connection between the first AP and the client device.

The short-term drop in performance may have a severe impact on one or more users of the wireless environment. As an example, if a large number of client devices are associated with a particular AP, and the RF channel of the particular AP is changed, then a large number of wireless connections would be disrupted. The large number of client devices would need to either switch channels to re-associate with the particular AP or associate with another AP. Due to the large number of client devices affected, a longer period of time may be necessary to form the new associations. In contrast, if a small number of client devices are associated with a particular AP, and the RF channel of the particular AP is changed, then a small number of wireless connections would be disrupted. A small number of client devices would be affected. Further, a shorter period of time may be sufficient for switching the client devices to another RF channel and/or associating with another AP.

As another example, if a client device is forced to switch from associating with a first AP to a second AP while exchanging video data with the first AP, then the wireless connection for the video data is disrupted. Video data is more sensitive to latency than other types of data such as textual data. The video stream that a user is viewing may become jittery and/or interrupted. In contrast, if a client device is forced to switch from associating with a first AP to a second AP while exchanging textual data with the first AP, then the disruption in the wireless connection may not be noticeable to the user.

The negative short-term effect of a corrective action may be reduced if the corrective action is executed on a delayed basis. The impact of the short-term effect and/or the criteria used to delay execution of the corrective action may be obtained or estimated using various methods, including manual configuration, an Expert system or a Machine Intelligent system (sometimes known as Artificial Intelligence-based system). As an example, a corrective action may not be executed until the number of client devices in a wireless environment falls below a specified threshold value. The number of client devices in the wireless environment may be large during working hours, but may fall below the threshold value in the evening. As another example, a corrective action may not be executed until transmission of data that is latency-sensitive is completed. Accordingly, one or more embodiments include delaying the execution of a corrective action.

2. Architectural Overview

Figure 1:
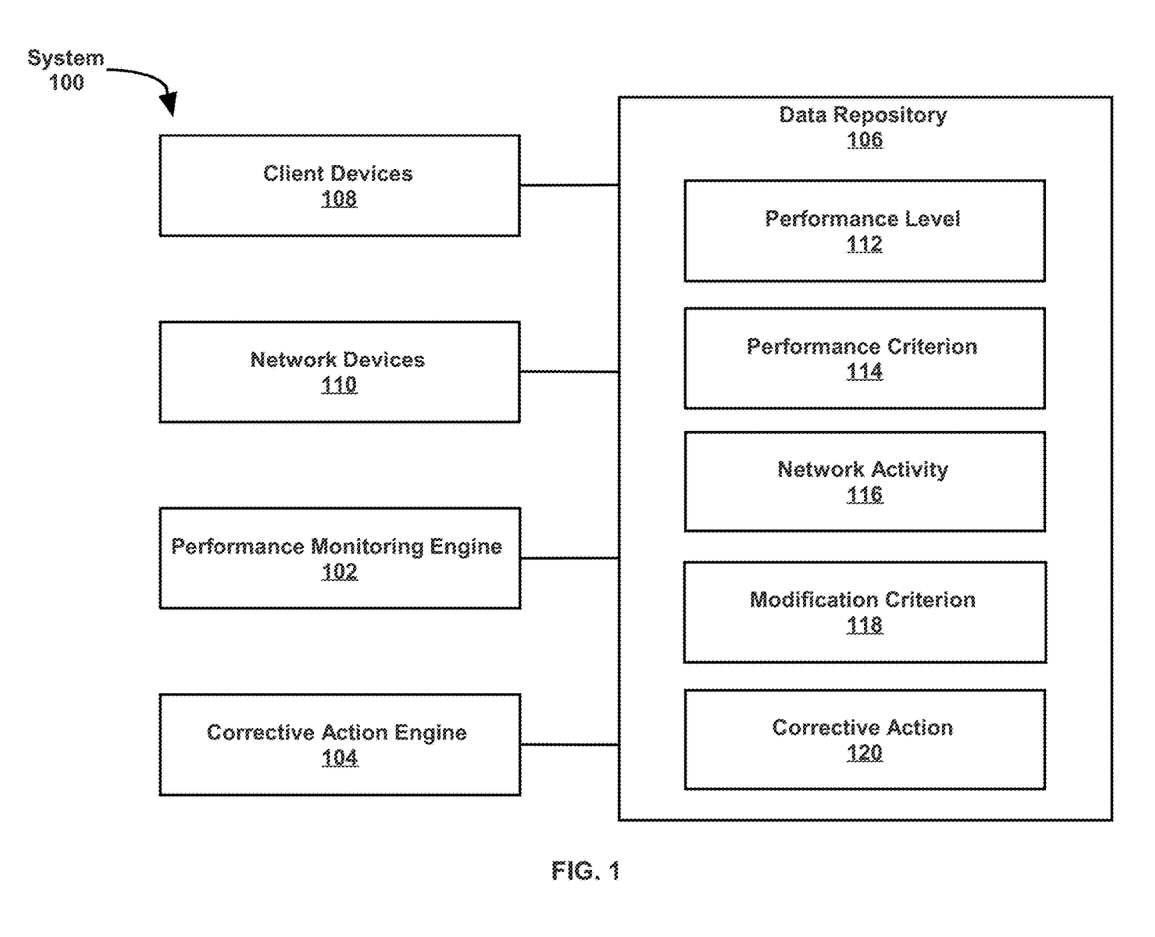
FIG. 1 illustrates a system in accordance with one or more embodiments.

FIG. 1 illustrates a system 100 in accordance with one or more embodiments. As illustrated in FIG. 1, system 100 includes client devices 108, network devices 110, a performance monitoring engine 102, a corrective action engine 104, and a data repository 106. In one or more embodiments, system 100 may include more or fewer components than the components illustrated in FIG. 1. The components illustrated in FIG. 1 may be local to or remote from each other. The components illustrated in FIG. 1 may be implemented in software and/or hardware and may be distributed over one or more applications and/or machines. Operations described with respect to one component may instead be performed by another component.

In an embodiment, performance monitoring engine 102, corrective action engine 104, and/or data repository 106 may be implemented or executed as part of an Expert system, Rule-Based system, Self-Learning system, or Machine-Learning system based on Machine Intelligence or Artificial Intelligence techniques. The system may be executed and/or distributed on one or more digital devices that are local to the wireless environment and/or digital devices that are remote to the wireless environment. A digital device that is local to the wireless environment may be, for example, a network device 110 (such as, an access point). A digital device that is remote to the wireless environment may be, for example, a cloud controller.

In one or more embodiments, network devices 110 are digital devices that communicate wirelessly with one or more other digital devices (such as client devices 108). As an example, a network device 110 may facilitate access to one or more network resources by a client device 108. The term "digital device" generally refers to any hardware device that includes a processor. A digital device may refer to a physical controller device or a hardware device executing a virtual controller. Examples of digital devices include a computer, a tablet, a laptop, a desktop, a netbook, a server, a web server, authentication server, an authentication-authorization-accounting (AAA) server, a Domain Name System (DNS) server, a Dynamic Host Configuration Protocol (DHCP) server, a Remote Authentication Dial-In User Service (RADIUS) server, a Lightweight Directory Access Protocol (LDAP) server, an Internet Protocol (IP) server, a Virtual Private Network (VPN) server, a network policy server, a mainframe, a television, a content receiver, a set-top box, a video gaming console, a printer, a mobile handset, a smartphone, a personal digital assistant (PDA), a wireless receiver and/or transmitter, a base station, a communication management device, a router, a switch, a cloud server, a cloud controller, a controller, and an Access Point (AP) (including a wireless AP).

In an embodiment, network devices 110 include one or more digital devices having functionality to transmit and/or receive information without being connected by an electrical conductor. A digital device having functionality to transmit and/or receive information from each other without being connected by an electrical conductor is referred to herein as a "wireless device." The functionality to wirelessly communicate may be implemented through, for example, an IEEE 802.11 wireless interface and one or more radios.

In one or more embodiment, client devices 108 are digital devices that are configured to communicate wirelessly with one or more other digital devices (such as network devices 110). Client devices 108 include one or more wireless devices, which may transmit and/or receive wireless signals based on IEEE 802.11 standards.

As an example, a client device 108 may connect to one or more network resources through a network device 110. A client device 108 may be configured to receive, through the network resources, web traffic, voice data streams, video data streams, and/or any other type of data.

As another example, a client device 108 may be a digital device that is used in an Internet of Things (IoT) or Internet of Everything (IoE) environment. An IoT or IoE environment is a network of digital devices, each having particular functionality to sense, collect, monitor, detect, analyze, process, transmit, receive, and/or exchange data. An IoT or IoE device may be located in a wireless environment without actively seeking access to a network resource. An IoT or IoE device may operate in power-save mode. In power-save mode, the device periodically wakes up to receive broadcast data from one or more network devices. The device uses the broadcast data to determine whether data addressed to the device was transmitted within the prior period. The device may connect to a network resource only upon a particular trigger.

In one or more embodiments, data repository 106 is any type of storage unit and/or device (e.g., a file system, database, collection of tables, or any other storage mechanism) for storing data. Further, data repository 106 may include multiple different storage units and/or devices. The multiple different storage units and/or devices may or may not be of the same type or located at the same physical site. Further, data repository 106 may be implemented or may execute on the same computing system as performance monitoring engine 102 and/or corrective action engine 104. Alternatively or additionally, data repository 106 may be implemented or executed on a separate computing system than performance monitoring engine 102 and/or corrective action engine 104. Data repository 106 may be connected to performance monitoring engine 102 and/or corrective action engine 104 via a direct connection or via a network.

Data sets describing performance level 112, performance criterion 114, network activity 116, modification criterion 118, and corrective action 120, may be implemented across any of components within system 100. However, these data sets are illustrated within data repository 106 for purposes of clarity and explanation.

In one or more embodiments, performance level 112 is a measurement and/or detection of one or more attributes related to a connection between an AP and a client device 108. Examples of performance levels 112 include but are not limited to:
  (a) whether a client device 108 is associated with an AP in a wireless environment;
  (b) whether a client device is able to connect to an AP with a specific configuration (the specific configuration including, for example, a particular RF channel, a particular security level, a particular band, and/or a particular AP);
  (c) whether a client device lost a connection to an AP;

(d) an amount of time needed for a client device 108 to associate with an AP;
(e) an amount of time needed for a client device 108 to switch from associating with a first AP to associating with a second AP;
(f) a received signal strength or Signal-To-Noise Ratio (SNR) of wireless signals exchanged between a client device 108 and an AP;
(g) a rate at which data is exchanged between a client device 108 and an AP;
(h) a Modulation and Coding Scheme (MCS) or Physical Layer (PHY) rate at which data is exchanged between a client device 108 and an AP;
(i) an error rate associated with the data exchanged between a client device 108 and an AP;
(j) an aggregation state associated with the data packets exchanged between a client device 108 and an AP;
(k) a beam-forming state associated with a client and AP at any particular time;
(l) a Multi-User Multiple-Input and Multiple-Output (MU-MIMO) state associated with a client device;
(m) whether a client device 108 is in distress (such as, seeking to associate with alternate APs at a rate that is above a specified threshold, or connecting and disconnecting from certain APs at a rate that is above a specified threshold);
(n) whether a client device 108 is optimally connected to a network resource (such as, using an optimal band, using an optimal RF channel, and/or associating with an optimal AP); and
(o) an amount of interference (such as co-channel interference, overlapping channel interference, and/or non-Wi-Fi interference) experienced by a client device 108.

In one or more embodiments, performance criterion 114 is a minimum performance level that is desired to be achieved in a wireless environment. Performance criterion 114 specifies a target performance level. Examples of performance criteria 114 include but are not limited to:
(a) a maximum amount of time needed for a client device 108 to switch from associating with a first AP to associating with a second AP;
(b) a minimum received signal strength or SNR of wireless signals exchanged between a client device 108 and an AP;
(c) a minimum rate at which data is exchanged between a client device 108 and an AP;
(d) ability of a client device 108 to connect to an AP;
(e) ability of a client device 108 to maintain connectivity to an AP;
(f) ability of a client to use beam-forming or a certain beam-forming parameter;
(g) ability of a client to be part of MU-MIMO or part of a specific MU-MIMO group;
(h) a maximum deviation across the loads of multiple APs and/or radios (load balancing);
(i) selection of an AP and/or radio, to be associated with a client device 108, that provides a best performance for one or more client devices in a wireless environment (the selection may be performed at initial connection of a client device to a network resource and/or at roaming of a client device);
(j) selection of a channel for an AP and/or radio that provides a best performance for one or more client devices in a wireless environment; and
(k) selection of a cell size for an AP and/or radio that provides a best performance for one or more client devices in a wireless environment.

In one or more embodiments, network activity 116 includes transmission and/or receipt of network data, beacons, management frames, control frames, broadcast data, power-save indications, and any other information between a client device 108 and an AP. As an example, network activity 116 is voice data transmitted from a client device 108 to an AP. As another example, network activity 116 is an error code received by a client device 108 from an AP.

In an embodiment, network activity 116 is associated with one or more attributes of the information being transmitted and/or received. An attribute describes the content of information, the flow of information, and/or other aspects of the information. Examples of attributes include the rate at which data being transmitted, the level of priority and/or importance of the data, the source address and/or destination address of the data, the data type (such as, voice data, video data, or textual data) of the data, and an event (such as a meeting, a conference, a screen share, or a demonstration) being conducted based on the data.

In one or more embodiments, modification criterion 118 is a criterion that is to be satisfied by network activity 116 (and/or an attribute thereof) prior to executing a corrective action 120. Modification criterion 118 is used to ensure that a wireless configuration in the wireless environment is not modified during a time period when interruption of network activity 116 is not desired. Examples of modification criterion 118 include but are not limited to:
(a) a maximum rate at which data is transmitted to and from one or more client devices 108 and one or more APs in a wireless environment;
(b) a maximum number of client devices 108 that are exchanging data with one or more APs;
(c) a client state such as sleep or power-save state or being member of a specific MU-MIMO group;
(d) a particular location in which client devices 108 that are exchanging data with one or more APs are located; and
(e) a particular category of transmitted data that is uninterruptable.

Examples of uninterruptable categories of data include data that is sensitive to latency (such as voice data or video data), and data that is used to conduct an event that is not to be interrupted (such as an important meeting, conference, screen share, or demonstration).

In an embodiment, modification criterion 118 may be a particular time of day. As an example, the number of client devices 108 in a wireless environment between 2 am and 4 am may be estimated based on historical data, or may be assumed, to be below a specified threshold. The modification criterion may be that the current time is between 2 am and 4 am.

In one or more embodiments, corrective action 120 is one or more actions and/or operations that may be performed to correct, improve, or change performance level 112. Corrective action 120 may include modifying a wireless configuration of a client device 108 and/or a wireless configuration of a network device 110. Corrective action 120 may, for example, improve the current performance level 112 associated with the wireless connection, prevent reduction of the current performance level 112, and/or result in avoiding failure of a wireless connection between a client device 108 and an AP. Examples of corrective actions 120 include but are not limited to:
(a) terminating a wireless connection between a client device 108 and an AP;
(b) resetting a wireless connection between a client device 108 and an AP;

(c) forcing a client device 108 to switch from associating with a first AP to associating with a second AP;

(d) modifying one or more wireless configurations of a network device 110; and (e) modifying one or more wireless configurations of a client device 108.

Wireless configurations of a network device 110 include but are not limited to a transmit power, a Modulation and Coding Scheme (MCS) or a Physical Layer (PHY) rate, a probe response threshold, a disassociate threshold, a receive sensitivity, a receive gain, a transmit cell size, a receive cell size, and a radio frequency (RF) channel.

Wireless configurations of a client device 108 include but are not limited to a transmit power, a MCS or PHY rate, a retry rate, and an aggregation size.

In one or more embodiments, performance monitoring engine 102 refers to hardware and/or software configured to perform operations described herein for determining whether a performance level 112 satisfies a performance criterion 114. Examples of operations for determining whether a performance level satisfies a performance criterion are described below with reference to FIG. 2.

In an embodiment, performance monitoring engine 102 is implemented on one or more network devices 110, such as an AP. Additionally or alternatively, performance monitoring engine 102 is implemented on one or more other digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, authentication server, an authentication-authorization-accounting (AAA) server, a Domain Name System (DNS) server, a Dynamic Host Configuration Protocol (DHCP) server, a Remote Authentication Dial-In User Service (RADIUS) server, a Lightweight Directory Access Protocol (LDAP) server, an Internet Protocol (IP) server, a Virtual Private Network (VPN) server, a network policy server, a mainframe, a television, a content receiver, a set-top box, a video gaming console, a printer, a mobile handset, a smartphone, a personal digital assistant (PDA), a wireless receiver and/or transmitter, a base station, a communication management device, a router, a switch, a cloud server, a cloud controller, a controller, an Access Point (AP), and a wireless access point (WAP).

In one or more embodiments, corrective action engine 104 refers to hardware and/or software configured to perform operations described herein for selecting a corrective action 120 and/or determining when to execute a corrective action 120. Examples of operations for selecting a corrective action and/or determining when to execute a corrective action are described below with reference to FIG. 2.

In an embodiment, corrective action engine 104 is implemented on one or more network devices 110, such as an AP. Additionally or alternatively, corrective action engine 104 is implemented on one or more other digital devices.

3. Delaying Execution of a Corrective Action in a Wireless Environment

Figure 2:
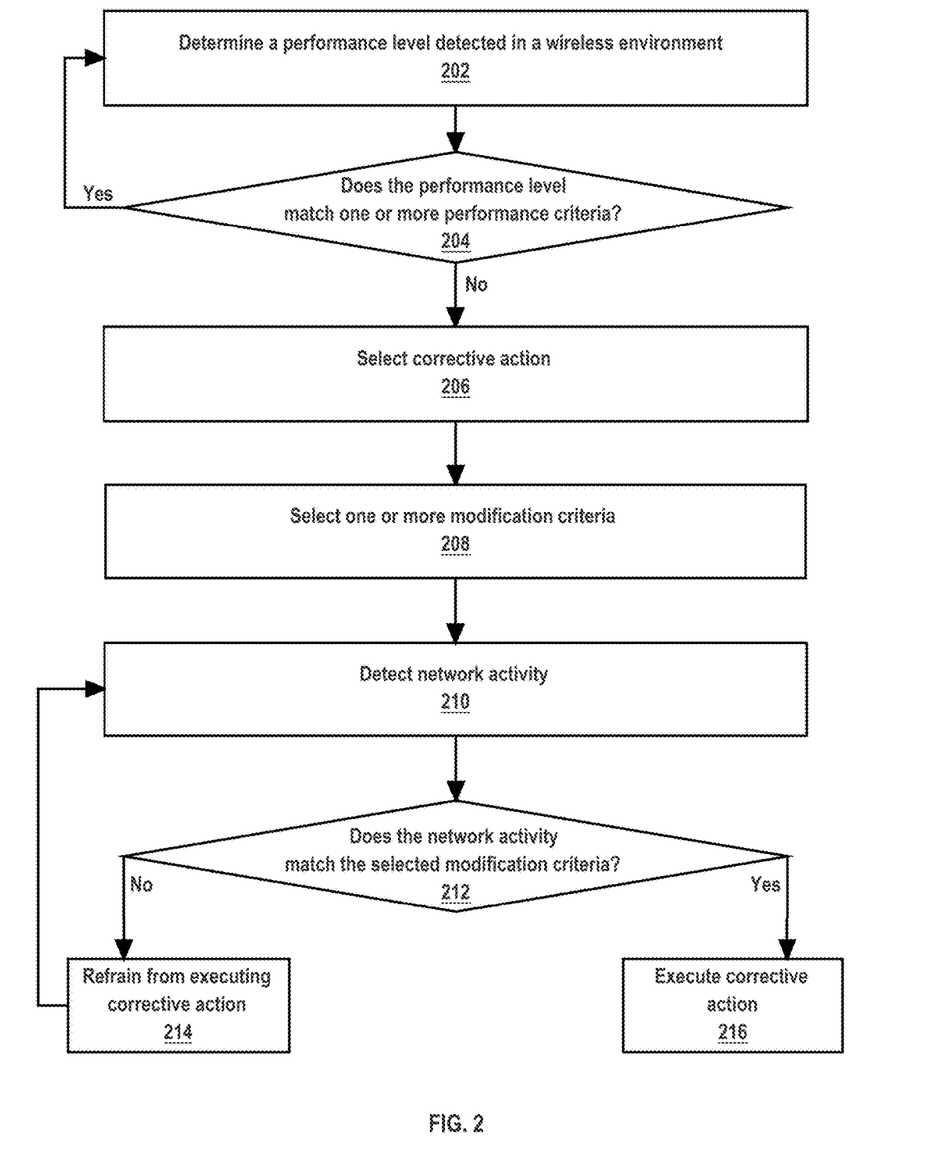
FIG. 2 illustrates an example set of operations for delaying execution of a corrective action in a wireless environment, in accordance with one or more embodiments.

FIG. 2 illustrates an example set of operations for delaying execution of a corrective action in a wireless environment, in accordance with one or more embodiments. One or more operations illustrated in FIG. 2 may be modified, rearranged, or omitted all together. Accordingly, the particular sequence of operations illustrated in FIG. 2 should not be construed as limiting the scope of one or more embodiments.

One or more embodiments include determining a performance level in a wireless environment (Operation 202). The performance level is detected by one or more client devices and/or network devices. A performance level related to a connection between a particular client device and a particular AP may be detected by the particular client device, the particular AP, and/or another client device and/or network device.

As an example, a particular client device is associated with a particular AP. The particular AP detects a wireless signal from the particular client device at a particular signal strength. The particular AP also detects a particular noise floor. A signal-to-noise ratio (SNR) is determined based on the particular noise floor and the particular signal strength. The SNR is determined as a performance level.

As another example, a particular client device is associated with a first AP. The particular client device detects a wireless signal from the first AP at a first signal strength. The first signal strength is below a specified threshold value, indicating that the particular client device should disassociate with the first AP and associate with another AP if possible. The particular client device also detects a wireless signal from a second AP at a second signal strength. The second signal strength is above the specified threshold value, indicating that the client device may associate with the second AP. The client device disassociates with the first AP. The first AP determines a time at which the disassociation occurs. The client device then associates with the second AP. The second AP determines a time at which the association occurs. The duration between the time at which the disassociation with the first AP occurs and the time at which the association with the second AP occurs is determined as a an amount of time needed for the particular client device to switch from associating with the first AP to associating with the second AP. The amount of time needed for the particular client device to switch from the first AP to the second AP is determined as a performance level.

One or more embodiments include inquiring whether the performance level matches one or more performance criteria (Operation 204). The performance criteria is retrieved from a data repository and compared to the performance level.

In an embodiment, a first performance criterion specifies a maximum threshold value and/or a minimum threshold value that must be satisfied. A match is found if the performance level is below the maximum threshold value and/or below the minimum threshold value. As an example, a performance criterion is that a client device must receive a wireless signal from an AP at a signal strength greater than −60 dBm. A particular client device receives a wireless signal from the AP at −55 dBm, which is above the minimum threshold value. The performance level corresponding to the connection between the particular client device and the AP matches the performance criterion.

In an embodiment, a second performance criterion specifies a particular statement of fact that must be found to be true. As an example, a performance criterion is that a client device within a particular physical area must be associated with one of a set of APs. A particular AP, in the set of APs, detects a wireless signal from a particular client device at a particular signal strength. Based on the particular signal strength, the particular client device is determined to be within the particular physical area. However, the particular client device is not associated with any of the set of APs. Hence, the statement that a client device within the particular physical area is associated with the set of APs is false. The performance level does not match the performance criterion.

As another example, a performance criterion is that a client device must be associated with an AP, in a set of APs, that provides the best performance for the client device. The best performance is achieved if (a) the client device receives a wireless signal from an AP at a signal strength above a minimum threshold value, and (b) out of the set of APs that match the above criterion, the client device is associated with the AP with the lightest load. A particular client device receives a first wireless signal from a first AP at a signal strength above the minimum threshold value. The particular client device also receives a second wireless signal from a second AP at a signal strength above the minimum threshold value. Out of the first AP and the second AP, the first AP has the lightest load. If the particular client device is associated with the first AP, then the statement that the client device is associated with an AP that provides the best performance for the client device is true. Then, the performance level matches the performance criterion.

In one or more embodiments, if the performance level matches the performance criteria, then the performance level continues to be detected (Operation 202). The performance level is detected periodically, for example, at 15-second intervals. The performance level detected at each time interval is compared to the performance criteria again.

In one or more embodiments, if the performance level does not match the performance criteria, then a corrective action is selected (Operation 206). The corrective action is selected using a first set of rules stored at a data repository. The first set of rules may be stored in various forms, such as a table, a list, and/or a set of logic statements. A rule specifies one or more corrective actions that correspond to a particular mismatch between the performance level and the performance criteria. A corrective action may correspond to a particular mismatch based on the type of the performance criterion that was not satisfied, the amount of mismatch between the performance level and the performance criterion, and/or other factors.

As an example, a particular performance criterion is that a client device must receive a wireless signal at a signal strength above −60 dBm. A particular corrective action is to increase the transmit cell size of an AP.

A first rule specifies that the particular corrective action corresponds to a mismatch between the performance level and the particular performance criterion, if the difference between a detected signal strength and the minimum signal strength is less than 10 dBm. A second rule specifies that another corrective action (such as disassociating the client device from the AP and associating the client device with another AP) corresponds to a mismatch between the performance level and the particular performance criterion, if the difference between a detected signal strength and the minimum signal strength is greater than 10 dBm.

A particular client device receives a wireless signal from a particular AP at −65 dBm. A difference between the detected signal strength and the minimum signal strength is 5 dBm. Since the difference is less than 10 dBm, the first rule applies. Based on the first rule, the particular corrective action corresponds to the mismatch between the performance level and the particular performance criterion. The particular corrective action is selected.

In an embodiment (not shown), the sequence of operations may differ. The corrective action is selected prior to execution of the corrective action at Operation 216. However, the corrective action may be selected after inquiring whether network activity matches modification criteria at Operation 212. Alternatively or additionally, the corrective action may be selected after refraining from execution of any corrective actions at Operation 214.

One or more embodiments include selecting one or more modification criteria (Operation 208). A modification criterion is selected using a second set of rules stored at a data repository. The second set of rules may be stored in various forms, such as a table, a list, and/or a set of logic statements. A rule specifies one or more modification criteria that correspond to a detected performance level, a performance criterion that was not satisfied, and/or a selected corrective action.

In an embodiment, a stricter modification criterion is selected if the corrective action to be taken is more intrusive. As an example, a first corrective action is to change a channel of an AP. A second corrective action is to increase the transmit power of an AP. The first corrective action would affect all client devices associated with the AP. In contrast, the second corrective action would not interrupt an existing connection between a client device and the AP. The first corrective action is more intrusive.

Since the first corrective action is more intrusive, a set of rules specifies a stricter modification criterion for the first corrective action. A first modification criterion is that a number of active clients is below 2. A second modification criterion is that a number of active clients is below 7. The first modification criterion is stricter than the second modification criterion. A first rule indicates that the first modification criterion is selected for the first corrective action. A second rule indicates that the second modification criterion is selected for the second corrective action.

In an embodiment, a less strict modification criterion is selected if the amount of mismatch between the detected performance level and the performance criterion is greater. As an example, a performance criterion is that an amount of time needed for a client device to switch from associating with a first AP to associating with a second AP must be less than 0.3 seconds. During a first time period, a first detected performance level indicates that the time needed for the switch is 0.9 seconds. The mismatch between the first detected performance level and the performance criterion is 0.6 seconds. During a second time period, a second detected performance level indicates that the time needed for the switch is 0.4 seconds. The mismatch between the second detected performance level and the performance criterion is 0.1 seconds. The mismatch associated with the first detected performance level is greater than that associated with the second detected performance level.

Continuing this example, a set of rules specifies a less strict modification criterion for a greater mismatch. A first modification criterion is that network data traffic does not include any video data. A second modification criterion is that network data traffic does not include any video data or voice data. The first modification criterion is less strict than the second modification criterion. A first rule indicates that the first modification criterion is selected in response to determining the first detected performance level. A second rule indicates that the second modification criterion is selected in response to determining the second detected performance level.

One or more embodiments include detecting network activity (Operation 210). The network activity associated with one or more client devices and/or APs is detected. The network activity is detected by one or more client devices and/or network devices.

As an example, two client devices are associated with a particular AP. The particular AP detects the total level of network data traffic being transmitted to and from the two client devices. The particular AP also detects a first data type of the network data traffic to and from a first client device, and a second data type of the network data traffic to and from a second client device. The total level of network data traffic, the first data type, and the second data type constitute network activity in the wireless environment.

As another example, network data traffic that is of a high priority is tagged with a priority flag. A particular AP detects network data traffic to and from a particular client device. The particular AP analyzes the network data traffic to determine whether the network data traffic includes a priority flag. If so, then the network data traffic is determined to be of high priority. The priority of the network data traffic constitutes network activity in the wireless environment.

As another example, an AP has a beacon interval of 100 ms. A Traffic Indication Map (TIM) and/or a Delivery Traffic Indication Message (DTIM) is transmitted on every other beacon frame. A particular client device operates in power-save mode. In power-save mode, the particular client device wakes up to receive the TIM data from the AP at an interval of approximately 200 ms. Based on the time at which the TIM data was last transmitted and/or the time at which the particular client device was last awake, the AP determines the next time at which the particular client device would be awake. Hence, the AP determines whether the particular client device is awake at any given time. Whether the particular client device is awake constitutes network activity in the wireless environment.

One or more embodiments include inquiring whether the network activity matches the selected modification criteria (Operation 212). One or more attributes of the information being transmitted and/or received by a client device and/or an AP are determined. A modification criterion is compared to the attributes of the information. If the attributes of the information satisfy the modification criterion, then the network activity matches the modification criterion.

In an embodiment, a first modification criterion specifies a maximum threshold value and/or a minimum threshold value that must be satisfied. A match is found if an attribute of the network activity is below the maximum threshold value and/or below the minimum threshold value. As an example, a modification criterion is that a number of active clients is below 2. A detected number of active clients is 5, which is above the maximum threshold value. The network activity does not match the modification criterion.

In an embodiment, a second modification criterion specifies a particular statement of fact that must be found to be true. As an example, a modification criterion is that any client device associated with a set of APs is not located in a particular conference room. Each of the set of APs transmits network data traffic to one or more client devices, and detects network data traffic from one or more client devices. The set of APs identifies a set of client devices that transmit and/or receive network data traffic to and/or from the set of APs. The location of each of the set of client devices is determined. None of the locations of the client devices are within the particular conference room. The network activity matches the modification criterion.

In one or more embodiments, if the network activity does not match the modification criteria, then the corrective action is not executed (Operation 214). The process returns to detecting network activity (Operation 210). The network activity is detected periodically, for example, at 15-minute intervals. The network activity detected at each time interval is compared to the modification criteria again. Execution of the corrective action is delayed until the network activity matches the modification criteria.

In one or more embodiments, if the network activity matches the modification criteria, then the corrective action is executed (Operation 216). The corrective action is executed during a time period that is different from the time period in which the performance level (that did not match the performance criteria) was detected. The corrective action is executed to improve the performance level.

As an example, at 10 a.m. on a weekday, a first performance level is detected. The first performance level does not match a performance criterion. A particular corrective action is selected. The network activity is detected and compared to a modification criterion. The network activity does not match the modification criterion until 10 p.m. of the same day. After determining the match between the network activity and the modification criterion, the particular corrective action is executed. The particular corrective action improves the performance level. At 10 a.m. the next day, a second performance level is detected. The second performance level matches the performance criterion.

5. Example Embodiment

Figure 3A:
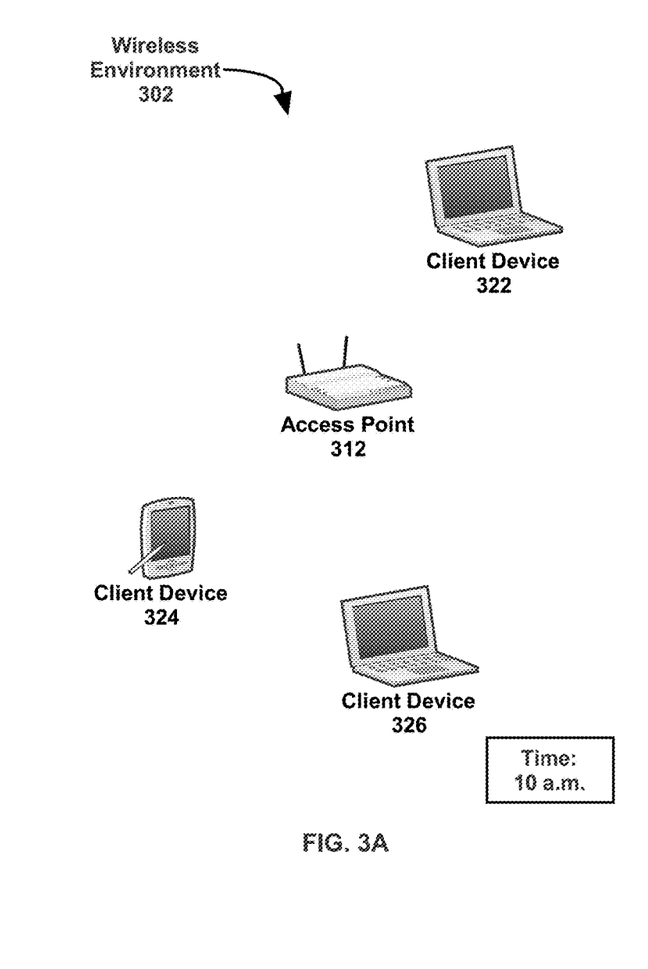
FIGS. 3A and 3B illustrate an example of delaying execution of a corrective action in a wireless environment, in accordance with one or more embodiments.
Figure 3B:
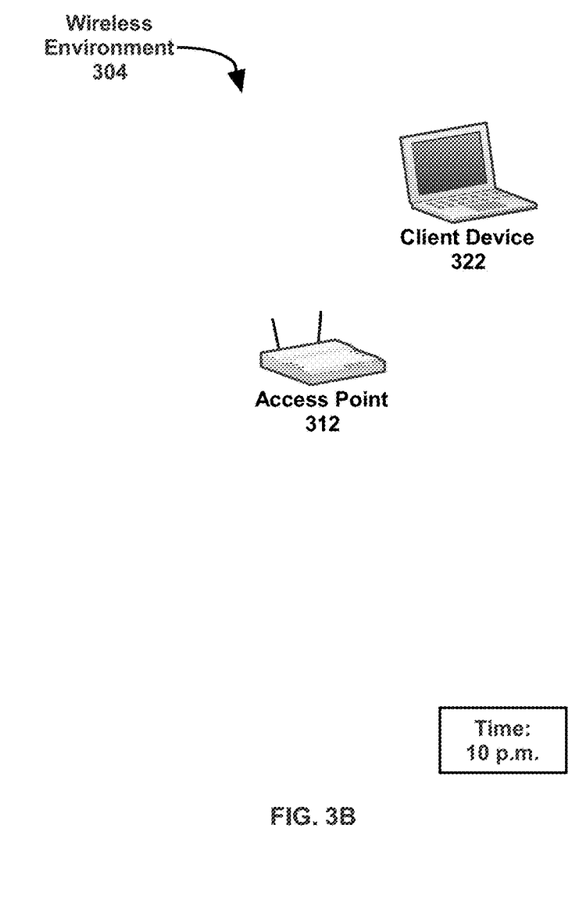

A detailed example is described below for purposes of clarity. Components and/or operations described below should be understood as one specific example which may not be applicable to certain embodiments. Accordingly, components and/or operations described below should not be construed as limiting the scope of any of the claims. FIGS. 3A and 3B illustrate an example of delaying execution of a corrective action in a wireless environment, in accordance with one or more embodiments.

FIG. 3A shows wireless environment 302 at a first time period, which is 10 a.m. Wireless environment 302 includes an access point 312, a client device 322, a client device 324, and a client device 326. Client devices 322-326 are each associated with access point 312.

A performance level corresponding to each client device is detected during the first time period. Client device 322 receives a wireless signal from access point 312 at −50 dBm. Client device 324 receives a wireless signal from access point 312 at −40 dBm. Client device 326 receives a wireless signal from access point 312 at −65 dBm.

A performance criterion is that each client device associated with access point 312 must receive wireless signals from access point 312 at a signal strength above −60 dBm. An inquiry is made as to whether the performance levels of client devices 322-326 match the performance criterion. The received signal strength detected by client device 322 is above the minimum threshold value of −50 dBm. The received signal strength detected by client device 324 is above the minimum threshold value of −50 dBm. However, the received signal strength detected by client device 326 is below the minimum threshold value of −50 dBm. Therefore, the performance level corresponding to client device 326 does not match the performance criterion.

A first set of rules stored in a data repository specifies corrective actions corresponding to different detected performance levels and/or performance criteria that were not satisfied. A particular corrective action is to increase the transmit power of an AP. A particular rule specifies that the particular corrective action is to be applied if a performance criterion that was not satisfied is related to a received signal strength. Based on the particular rule, since the performance criterion that has not been satisfied requires a certain minimum received signal strength, the particular corrective action is selected.

A second set of rules stored in a data repository specifies modification criteria corresponding to different detected performance levels, performance criteria that were not satisfied, and/or selected corrective actions. A particular modification criterion is that a number of active clients must be below 2. A particular rule specifies that the particular modification criterion is to be selected if a selected corrective action would modify a wireless configuration of an AP. Based on the particular rule, since the selected corrective action is to increase the transmit power, the particular modification criterion is selected.

Network activity between client device 322 and access point 312 is detected. Network activity between client device 324 and access point 312 is detected. Network activity between client device 326 and access point 312 is detected. Based on the network activity, the total number of active client is 3.

An inquiry is made as to whether the network activity matches the selected modification criterion. The total number of active clients is 3, and is thus above the maximum threshold value of 2. Therefore the network activity does not match the selected modification criterion.

Since the network activity does not match the selected modification criterion, execution of the selected corrective action is delayed. The selected corrective action is not executed at this time.

Network activity continues to be detected. Network activity is detected periodically, such as at 15-second intervals. The network activity detected at each time interval is compared to the selected modification criterion to determine whether there is a match.

FIG. 3B shows wireless environment 304 at a second time period, which is 10 p.m. Wireless environment 304 includes access point 312 and client device 322. Client devices 324-326 have been removed from the wireless environment. Client device 322 is associated with access point 312.

Network activity between client device 322 and access point 312 is detected. The number of active clients is 1. An inquiry is made as to whether the network activity matches the selected modification criterion. The total number of active clients is now below the maximum threshold value of 2. Therefore the network activity matches the selected modification criterion.

Responsive to the match, the selected corrective action is executed during the second time period. The transmit power of access point 312 is increased. The execution of the selected corrective action has been delayed from the first time period (10 a.m.) to the second time period (10 p.m.). The time period in which the selected corrective action is executed is different from the time period in which the performance level (which did not match the performance criterion) was detected.

During a third time period, which is 10 a.m. of the next day (not shown), client devices 322-326 return to the wireless environment. Client devices 322-326 are each associated with access point 312. Based on the increase in transmit power of access point 312, performance levels corresponding to client devices 322-326 have improved. Client device 322 receives a wireless signal from access point 312 at −45 dBm. Client device 324 receives a wireless signal from access point 312 at −35 dBm. Client device 326 receives a wireless signal from access point 312 at −60 dBm.

The performance levels are compared to the performance criterion. The received signal strength detected by each client device is above the minimum threshold value of −50 dBm. Therefore, the performance levels match the performance criterion.

6. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

7. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
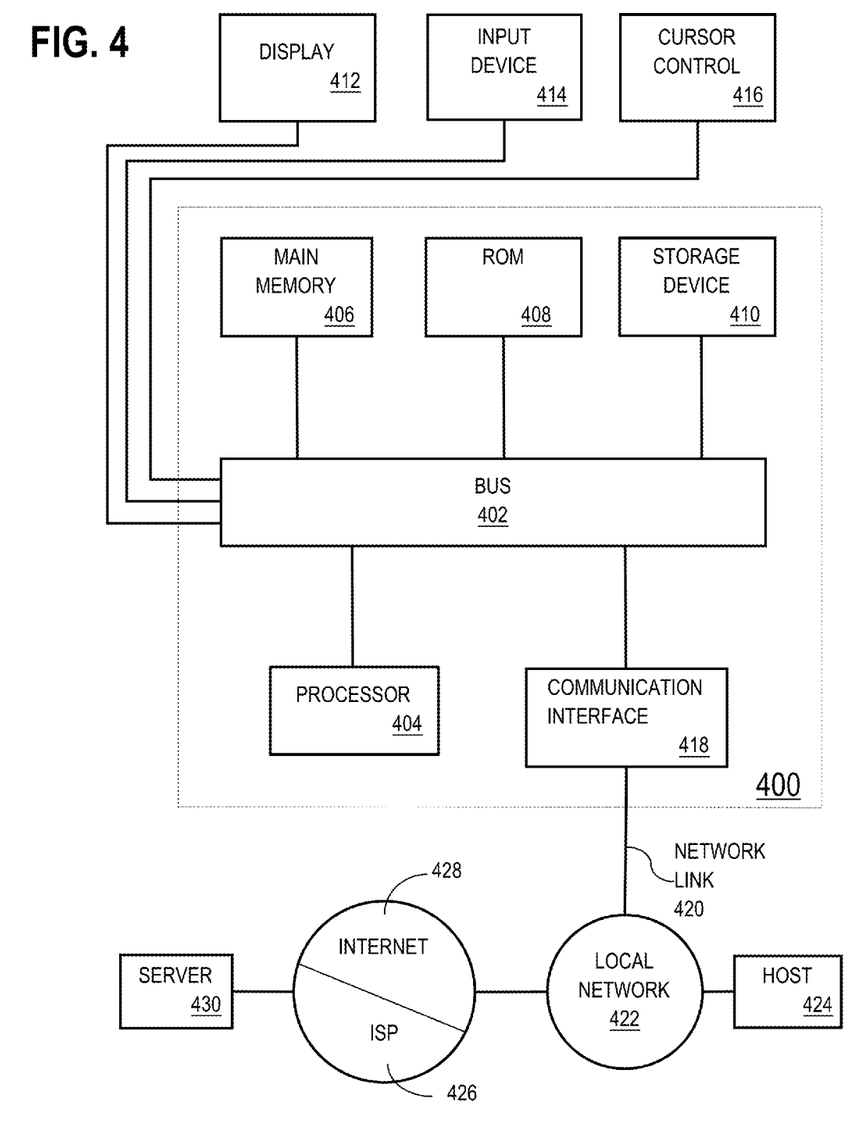
FIG. 4 shows a block diagram that illustrates a computer system in accordance with one or more embodiments.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, causes performance of operations comprising:
   determining that a performance level, detected during a first time period in a wireless environment, does not match a performance criterion; subsequent to the first time period and during a second time period:
   determining that a first set of network activity, detected during the second time period, does not match a modification criterion;

refraining from executing a corrective action to improve the performance level in response to: determining that the first set of network activity does not match the modification criterion;
subsequent to the second time period and during a third time period:
determining that a second set of network activity, detected during the third time period, matches the modification criterion; and
executing the corrective action to improve the performance level in response to: determining that the second set of network activity matches the modification criterion; wherein:
the modification criterion identifies a maximum level of network activity at which the corrective action may be executed; and
determining that the first set of network activity does not match the modification criterion comprises determining that a level of the first set of network activity exceeds the maximum level at which the corrective action may be executed.

2. The medium of claim 1, wherein:
the modification criterion identifies at least one uninterruptable category of network activity; and determining that the first set of network activity does not match the modification criterion comprises determining that a detected category of the first set of network activity matches the at least one uninterruptable category of network activity identified by the modification criterion.

3. The medium of claim 1, wherein:
the modification criterion identifies at least one uninterruptable event category; and determining that the first set of network activity does not match the modification criterion comprises determining, based on the first set of network activity, that an event of the at least one uninterruptable event category is ongoing.

4. The medium of claim 1, wherein the operations further comprise selecting the modification criterion based on the corrective action.

5. The medium of claim 1, wherein the operations further comprise selecting the modification criterion based on the performance level detected during the first time period.

6. The medium of claim 1, wherein the operations further comprise selecting the modification criterion based on the performance criterion.

7. The medium of claim 1, wherein:
a client device is associated with a first access point; and the corrective action comprises causing the client device to associate with a second access point different than a first access point.

8. A system comprising:
at least one hardware device including a processor; the system configured to perform operations comprising:
determining that a performance level, detected during a first time period in a wireless environment, does not match a performance criterion; subsequent to the first time period and during a second time period:
determining that a first set of network activities, detected during the second time period, does not match a modification criterion;
refraining from executing a corrective action to improve the performance level in response to: determining that the first set of network activities does not match the modification criterion;
subsequent to the second time period and during a third time period:
determining that a second set of network activities, detected during the third time period, matches the modification criterion; and executing the corrective action to improve the performance level in response to: determining that the second set of network activities matches the modification criterion; wherein:
the modification criterion identifies a maximum level of network activities at which the corrective action may be executed; and
determining that the first set of network activities does not match the modification criterion comprises determining that a level of the first set of network activities exceeds the maximum level at which the corrective action may be executed.

9. The system of claim 8, wherein:
the modification criterion identifies at least one uninterruptable category of network activity; and
determining that the first set of network activities does not match the modification criterion comprises determining that a detected category of the first set of network activities matches the at least one uninterruptable category of network activities identified by the modification criterion.

10. The system of claim 8, wherein:
the modification criterion identifies at least one uninterruptable event category; and determining that the first set of network activities does not match the modification criterion comprises determining, based on the first set of network activities, that an event of the at least one uninterruptable event category is ongoing.

11. The system of claim 8, wherein the operations further comprise selecting the modification criterion based on the corrective action.

12. The system of claim 8, wherein the operations further comprise selecting the modification criterion based on the performance level detected during the first time period.

13. The system of claim 8, wherein the operations further comprise selecting the modification criterion based on the performance criterion.

14. The system of claim 8, wherein:
a client device is associated with a first access point; and
the corrective action comprises causing the client device to associate with a second access point different than a first access point.

15. A method comprising:
determining that a performance level, detected during a first time period in a wireless environment, does not match a performance criterion; subsequent to the first time period and during a second time period:
determining that a first set of network activities, detected during the second time period, does not match a modification criterion;
refraining from executing a corrective action to improve the performance level in response to: determining that the first set of network activities does not match the modification criterion;
subsequent to the second time period and during a third time period:
determining that a second set of network activities, detected during the third time period, matches the modification criterion; and
executing the corrective action to improve the performance level in response to:
determining that the second set of network activities matches the modification criterion;

wherein:

the modification criterion identifies a maximum level of network activity at which the corrective action may be executed;

determining that the first set of network activity does not match the modification criterion comprises determining that a level of the first set of network activity exceeds the maximum level at which the corrective action may be executed; and the method is executed by at least one hardware device including a processor.

16. The method of claim 15, wherein:

the modification criterion identifies at least one uninterruptable category of network activity; and determining that the first set of network activity does not match the modification criterion comprises determining that a detected category of the first set of network activity matches the at least one uninterruptable category of network activity identified by the modification criterion.

17. The method of claim 15, wherein:

the modification criterion identifies at least one uninterruptable event category; and determining that the first set of network activity does not match the modification criterion comprises determining, based on the first set of network activity, that an event of the at least one uninterruptable event category is ongoing.

\* \* \* \* \*